US012731436B2

United States Patent
(12) Liu et al.

(10) Patent No.: US 12,731,436 B2
(45) Date of Patent: Sep. 8, 2026

(54) INTELLIGENT RECOGNITION METHOD FOR JOB CONTENTS OF BARBERSHOP EMPLOYEES

(71) Applicant: Chongqing University of Post and Telecommunications, Chongqing (CN)

(72) Inventors: Xin Liu, Chongqing (CN); Ying Qian, Chongqing (CN); Feng Chen, Chongqing (CN); Ning Zhou, Chongqing (CN); Meilan Jiang, Chongqing (CN)

(73) Assignee: Chongqing University of Post and Telecommunications, Chongqing (CN)

(*) Notice: Subject to any disclaimer, the term of this patent is extended or adjusted under 35 U.S.C. 154(b) by 0 days.

(21) Appl. No.: 18/689,419

(22) PCT Filed: Aug. 1, 2023

(86) PCT No.: PCT/CN2023/110482
§ 371 (c)(1),
(2) Date: May 14, 2025

(87) PCT Pub. No.: WO2024/046003
PCT Pub. Date: Mar. 7, 2024

(65) Prior Publication Data

US 2025/0225815 A1 Jul. 10, 2025

(30) Foreign Application Priority Data

Sep. 2, 2022 (CN) ......................... 202211072684.7

(51) Int. Cl.
*G06V 40/20* (2022.01)
*G06V 10/774* (2022.01)
(Continued)

(52) U.S. Cl.
CPC ............ *G06V 40/20* (2022.01); *G06V 10/774* (2022.01); *G06V 10/82* (2022.01); *G06V 40/172* (2022.01)

(58) Field of Classification Search
None
See application file for complete search history.

(56) References Cited

U.S. PATENT DOCUMENTS

| | | | | |
|---|---|---|---|---|
| 7,957,565 | B1 | 6/2011 | Sharma et al. | |
| 2023/0368141 | A1* | 11/2023 | Camus | G06Q 10/1053 |
| 2024/0144151 | A1* | 5/2024 | Maikhuri | G06Q 10/06398 |

FOREIGN PATENT DOCUMENTS

| | | | | |
|---|---|---|---|---|
| CN | 105678216 A | * 6/2016 | | G06F 18/2411 |
| CN | 110705463 A | * 1/2020 | | G06N 3/045 |

(Continued)

OTHER PUBLICATIONS

Office Action of corresponding CN application 202211072684.7, published on Jan. 24, 2025.

(Continued)

*Primary Examiner* — Jiangeng Sun
(74) *Attorney, Agent, or Firm* — Westbridge IP LLC

(57) ABSTRACT

The present invention relates to an intelligent recognition method for job contents of barbershop employees, which belongs to the technical field of machine vision, comprising the following steps: S1: setting installation locations and installation conditions for collection devices; S2: establishing a label set of barbershop employee faces and customer faces, and training a face recognition model; S3: establishing an action label set related to items, tools and people, and training a barbershop action behavior recognition model; S4: conducting action behavior recognition for a practical barbershop service scenario by using the trained face recognition model and the barbershop action behavior recognition model; and constructing behavior sequences of "action (Continued)

pairs" involving elements from customers, employees and actions; S5: establishing a job content recognition label; and constructing a deep neural network model for job content recognition to determine service job contents of barbershop employees for customers. The present invention facilitates efficient intelligent management of barbershops through an intelligent recognition method for job contents of barbershop employees.

8 Claims, 2 Drawing Sheets

(51) Int. Cl.
*G06V 10/82* (2022.01)
*G06V 40/16* (2022.01)

(56) References Cited

FOREIGN PATENT DOCUMENTS

| | | | | | |
|---|---|---|---|---|---|
| CN | 110781847 A | * | 2/2020 | | G06N 3/08 |
| CN | 111723729 A | * | 9/2020 | | G06N 3/045 |
| CN | 109002808 B | * | 10/2020 | | G06F 18/214 |
| CN | 109919031 B | * | 4/2021 | | |
| CN | 113435380 A | | 9/2021 | | |
| CN | 113963315 A | | 1/2022 | | |
| CN | 110852190 B | * | 5/2022 | | G06F 18/214 |
| CN | 111160078 B | * | 6/2023 | | G06F 18/2411 |
| CN | 110298257 B | * | 8/2023 | | G06V 20/597 |
| CN | 111310516 B | * | 8/2023 | | G06V 20/46 |
| CN | 117058751 A | * | 11/2023 | | G06V 40/20 |
| CN | 119785429 A | * | 4/2025 | | |

OTHER PUBLICATIONS

Notice of Grant of Patent Right of corresponding CN application 202211072684.7, published on Mar. 17, 2025.
Granted claims of corresponding CN application 202211072684.7.
Gui-Wu Wei, Gray Relational Analysis Method for Intuitionistic Fuzzy Multiple Attribute Decision Making, Expert Systems with Applications, 38(2011), Jan. 15, 2015, 11671-11677.
Jin Dai, et al., Novel Rapid Grey Incidence Analysis Method Based on Date Distribution, Journal of Jilin University (Engineering and Technology Edition), 45(1), Dec. 31, 2011, 283-290.

* cited by examiner

INTELLIGENT RECOGNITION METHOD FOR JOB CONTENTS OF BARBERSHOP EMPLOYEES

FIELD OF INVENTION

The present invention belongs to the technical field of machine vision, and relates to an intelligent recognition method for job contents of barbershop employees.

BACKGROUND ART OF THE INVENTION

At present, with the increase of demands for barbershop service items, the trend of large barbershop chains is gradually emerging. When there are many barbershop employees and diverse service items, it will bring difficulties to the daily management of barbershops, such as: the authenticity of job contents of employee services, the duration of the services provided, the materials used, corresponding quotations thereof, etc. At present, there is no intelligent system capable of automatically recognizing, monitoring and managing the above job contents.

DISCLOSURE OF THE INVENTION

In light of the foregoing, the purpose of the present invention is to provide an intelligent recognition method for job contents of barbershop employees, enabling real-time behavior recognition of the barbershop employees in practical scenarios, so as to achieve efficient intelligent management of the barbershops.

To achieve the above purpose, the present invention provides the following technical solution: An intelligent recognition method for job contents of barbershop employees comprises the following steps:

- S1: specifying installation locations and hardware conditions for collection devices, and recognizing barbershop employees and customers;
- S2: establishing a label set of barbershop employee faces and customer faces, and training a face recognition model;
- S3: establishing an action label set related to items, tools and people, and training a barbershop action behavior recognition model, which involves recognizing three categories of action behaviors: human actions, object operation interactions and human-to-human interactions that are relevant to the items, the tools, and actions in service jobs;
- S4: conducting action behavior recognition for a practical barbershop service scenario by using the trained face recognition model and the barbershop action behavior recognition model; and constructing behavior sequences of "action pairs" involving elements from customers, employees and actions;
- S5: establishing standard key behavior sequences with various types of barbershop service job contents as labels for job content recognition; and constructing a deep neural network model for job content recognition according to the behavior sequences of "action pairs", to determine service job contents of barbershop employees for customers.

Further, the step S1 specifically comprises: setting the installation locations and the hardware conditions of the collection device, such as camera performance requirements, installation locations, shooting angles, etc. to capture video frames in a barbershop scenario to satisfy requirements of confirming employee IDs, identifying customers, and detecting and recognizing items, the tools, and behavior actions.

Further, the step S3 specifically comprises the following steps:

- S31: building a label set for action behaviors that encompasses three categories: human actions, object operation interactions and human-to-human interactions; this set is related to the items, the tools and people in a service process, following the labeling rules of the AVA dataset;
- S32: training the barbershop action behavior recognition model, according to the established action behavior label set;
- S33: establishing a key action set of barbershop action behaviors.

Further, step S31 specifically comprises the following steps:

- S311: firstly, analyzing an originally collected behavior action video according to every 15 minutes, and uniformly dividing the 15-minute video into 300 non-overlapping 3-second clips; and following a strategy of maintaining a temporal sequence of actions during video sampling;
- S312: then, manually annotating bounding boxes for persons using an annotation tool LabelImg for the middle frame of each 3-second clip;
- S313: for each person in the annotated box, selecting an appropriate label from a prefabricated action label set to describe the actions of the person; the actions of the person include the following three categories of labels: human postures or displacement actions, human-object-human interaction actions, and human-human interaction actions;
- S314: finally, annotating all the video clips to establish a training label set for barbershop action behavior videos.

Further, in the step S32, a SlowFast model based on 3D-Resnet50 network is used for action behavior recognition; the SlowFast model is comprised of a Slow branch and a Fast branch;

- firstly, with Stride=16 frames as an interval, sampling is conducted from inputted video frames and inputted into a 3D-Resnet50 backbone network to extract environmental feature information during haircut;
- secondly, with step Stride=2 frames as an interval, sampling is conducted from an inputted video frame, and simultaneously, the number of channels is set to ⅛ times of that of the Slow branch, and inputted into the network to extract temporal sequence action feature information during haircut;
- then transverse connection is conducted on Res_conv3_1 and Res_conv4_1 layers of the 3D-Resnet50 backbone respectively, and the temporal sequence action feature information is integrated into environmental features;
- finally, classifying and predicting barbershop actions by using the integrated feature information from both the Slow branch and the Fast branch through a fully connected layer.

Further, in the step S33, according to the constructed action behavior label set and in combination with a practical application scenario of a barbershop, all action behaviors are divided into two sets:

- a key action behavior set: comprising cutting hair, curling hair, dyeing hair, perming hair, etc.;
- the key action behavior set is represented as $KeyAct=\{KeyAct_1, \ldots, KeyAct_i, \ldots, KeyAct_n\}$, wherein $KeyAct_i$ is the i-th key action behavior, $i=1, \ldots n$, and n represents the number of key action behaviors;

a normal action behavior set: comprising communication, standing, sitting, walking, etc.; and the normal action behavior set is represented as $NormalAct=\{NormalAct_1, \ldots, NormalAct_{i1}, \ldots, NormalAct_{n1}\}$, wherein $NormalAct_{i1}$ is the i1-th normal action behavior, $i1=1, \ldots n1$, and n1 represents the number of normal action behaviors.

Further, the S4 comprises the following steps:

S41: sampling real-time video frames according to certain rules for face recognition and action behavior recognition;

S42: according to confirmation of people identities by face recognition and action behavior recognition in a recognition process of a video temporal sequence, and recognition results of various behaviors, establishing identity correspondence relationships of customers and employees, and specific behavior sequences of "action pairs" in the service process, and recording "action pair" relationships of the customers and the employees in the video temporal sequence.

Further, step S41 specifically comprises the following steps:

S411: in the process of the barbershop service, sampling real-time video frames at a certain frame rate for identity recognition and action behavior recognition of people in real-time videos;

S412: inputting images obtained according to sampling rules into the face recognition model and determining customer membership statuses and employee identity information;

S413: associating the human regions delineated by detected boxes in a certain frame using the trained SlowFast model with face recognition results of a face boxes in a same frame and a same human region in S412 for subsequent people identity tracking when faces cannot be recognized;

S414: recognizing action behaviors of the barbershop employees and customers by using the trained SlowFast model in step S32, comprising: recognition of human posture/displacement actions of customers and employees, interaction behaviors of items and tools used by the employees and customer services in the service process, and interaction behaviors of the employees and the customers.

Further, step S42 specifically comprises the following steps:

S421: according to the station location and corresponding camera index information thereof, establishing a correlation relationship between customers and employees at the station; in a service process, when a customer and an employee enter the camera range of a station $station_k$, simultaneously completing face recognition of the customer and the employee by using the trained face recognition model in step S2 to activate establishment of a service pair $<Cid_p, Eid_q>$ of the customer and the employee on the station $station_k$, wherein $Cid_p$ represents a customer set, and $p=1, \ldots, m$; $Eid_q$ represents an employee set, $q=1, \ldots m1$, and m and m1 represent numbers of customers and employees respectively;

S422: activating the action behavior recognition model for people identity tracking and behavior recognition; in the camera range of the station $station_k$, conducting action behavior recognition for a real-time video sequence through the trained barbershop action behavior recognition model in step S32, wherein at time t, a recognized action set of customer $Cid_p$ is $Actp_t=\{Actp_{t,1}, \ldots, Actp_{t,k}\}$; and a recognized action set of employee $Eid_q$ is $Actq_t=\{Actq_{t,1}, \ldots, Actq_{t,k1}\}$, wherein k and $k_1$ are numbers of actions recognized by the customers and the employees at time t, and $Actp_{t,k}$ and $Actq_{t,k1}$ are recognized action behaviors:

$$Actp_{t,k} \text{ or } Actq_{t,k1} = \begin{cases} NormalAct_{i1}, & \text{when the action is a normal action behavior} \\ KeyAct_i, & \text{when the action is a key action behavior} \end{cases}$$

S423: according to the station location and corresponding camera index information thereof, further establishing correlation relationships between job contents corresponding to the customers, the employees and the service behaviors on the station; at time t, forming an "action pair"$<Actp_t, Actq_t>$ by the customer $Cid_p$ and the employee $Eid_q$ and constructing an "action pair" matrix;

sorting each action $Actp_{t,k}$ and $Actq_{tk,1}$ in $Actp_t$ and $Actq_t$ sets by probability values, taking first f actions, and forming a vector for each action:

$$Matrixp_{t,f} = [\text{probability value of } Actp_{t,f}, Actp_{t,f}]$$

and $$Matrixq_{t,f} = [\text{probability value of } Actq_{t,f}, Actq_{t,f}]$$

filling the actions in the vectors and probability values thereof with 0 values if the $Actp_t$ or $Actq_t$ set has no f actions; and filling the actions in the $Actq_{t,f}$ vector and probability values thereof with 0 values at wait time in the service process in which the employees may not be in a service region;

thus, constructing a 2f*2 matrix $Act_{<p,\ q>,t}=[Matrixp_{t,1}, \ldots, Matrixp_{t,f}, Matrixq_{t,1}, \ldots, Matrixq_{t,f}]$ through the "action pair"$<Actp_t, Act_q>$; and in the whole service process, for the customer $Cid_p$, establishing an "action pair" temporal sequence $S_p=[Act_{<p,\ q>,1}, \ldots, Act_{<p,\ q>,t}]$ based on the matrix $Act_{<p,\ q>,t}$ according to the video frame sequence.

Further, the step S5 comprises the following steps:

S51: establishing standard key behavior sequences with various types of barbershop service job contents by the key action behavior set KeyAct obtained from step S33 as job content recognition labels, expressed as $S_k=[KeyAct_{k,1}, \ldots, KeyAct_{k,i}]$, wherein $KeyAct_{k,i}$ represents the i-th action in the the k-th job content, and $KeyAct_{k,i} \in KeyAct$; and based on the length of the key behavior sequence in the longest standard, if the number of key behaviors in other sequences is insufficient, filling the remaining dimensions with 0;

S52: preprocessing the "action pair" temporal sequence $S_p=[Act_{<p,\ q>,1}, \ldots, Act_{<p,\ q>,t}]$ for the customer $Cid_p$ obtained from step S42, with a preprocessing method as follows:

S521: traversing "action pair" matrices in $S_p$, and calculating the similarity of two adjacent "action pair" matrices in $S_p$ by using matrix cosine similarity;

S522: if the similarity of the two adjacent "action pair" matrices is greater than a threshold, removing a latter "action pair" matrix, which indicates that action behaviors at two adjacent moments are repeated;

S523: continuing to traverse all the "action pair" matrices in $S_p$ until the end of the temporal sequence;

after $S_p$ is preprocessed, removing the probability value column of each action; changing the "action pair" matrices into $Act'_{<p, q>,t}=[Actp_{t,1}, \ldots, Actp_{t,f}, Actq_{t,1}, \ldots, Actq_{t,f}]$; obtaining the temporal sequence $S_p'=[Act'_{<p, q>,1}, \ldots, Act'_{<p, q>,t}]$ from the "action pair" matrix $Act'_{<p, q>,t}$ from the preprocessed temporal sequence, in which each remaining actions represent "action pairs" with certain differences;

S53: establishing a training data set by $S_p'$ from multiple customer service processes and corresponding job content recognition labels obtained by step S52, constructing a deep neural network model for job content recognition, inputting into the training data set and training the deep neural network model according to $S_p'$ and the corresponding job content label of each customer to minimize losses of the job content sequence vectors obtained by $S_p'$ of each customer through the deep neural network model and the corresponding job content label, specifically comprising the following steps:

S531: constructing a training data set, collecting videos and processing as mentioned above, or obtaining multiple $S_p'$ and corresponding job content recognition labels, and filling insufficient sequences with 0 based on a maximum sequence length of $S_p'$;

S532: a method for constructing the deep neural network model used for job content recognition is as follows: setting the maximum temporal sequence length of the "action pair" as ActNum, and transcoding each behavior in $S_p'$ into a vector with a dimension of (n+n1); the dimension of $S_p'$ after filling is $(2f\times(n+n1))\times ActNum$, wherein n represents the number of key action behaviors and n1 represents the number of normal action behaviors;

the steps for executing the deep neural network model used for job content recognition are as follows:

firstly, by using $S_p'$ as input after filling and transforming behavior vector, transforming the $((2f\times(n+n1))\times ActNum)$-dimensional input data into $(n\times ActNum)$-dimensional features through the first neural network module;

then, transforming the $(n\times ActNum)$-dimensional features into $(n\times MaxKeyActNum)$-dimensional features through the second neural network module, wherein MaxKeyActNum represents the number of key behaviors in a maximum standard key behavior sequence among different job contents;

finally, inputting the $(n\times MaxKeyActNum)$-dimensional features into a Transformer network, wherein position marks of $(n\times MaxKeyActNum)$-dimensional feature sequences are divided according to each behavior, and entering the Transformer network for position Embedding, and MaxKeyActNum key behavior vectors are finally outputted and mapped to the corresponding standard key behavior sequences of job contents.

Further, a calculation method for the similarity of the two adjacent "action pairs" $Act_{<p, q>j}$ and $Act_{<p, q>,j+1}$, $(j=1, \ldots, t)$ is as follows: encoding all action behaviors $Actp_{t,k}$ and $Actq_{t,k1}$ in the "action pair" matrices, calculating the cosine similarity of each row in $Act_{<p, q>j}$ and $Act_{<p, q>j+1}$ respectively to obtain similarity vectors, and then calculating arithmetic square roots of the similarity vectors to finally obtain the similarity of the two adjacent "action pair" matrices.

The present invention has the following beneficial effects: the present invention establishes the behavior correlation sequences of the employees and the customers through video image identity recognition and behavior action recognition, and maps the behavior correlation sequences of the employees and the customers into the corresponding standard key behavior sequences of job contents through the constructed deep neural network model for job content recognition within the service period, so as to achieve the purpose of recognizing and outputting the job contents and facilitate efficient intelligent management of barbershops.

Other advantages, objectives and features of the present invention will be illustrated moderately in the following description, and will be apparent to those skilled in the art based on the following investigation and research to some extent, or can be taught from the practice of the present invention. The objectives and other advantages of the present invention can be realized and obtained through the following description.

DESCRIPTION OF THE DRAWINGS

To enable the purpose, the technical solutions and the advantages of the present invention to be more clear, the present invention will be preferably described in detail below in combination with the drawings.

DETAILED DESCRIPTION OF THE INVENTION

Figure 1:
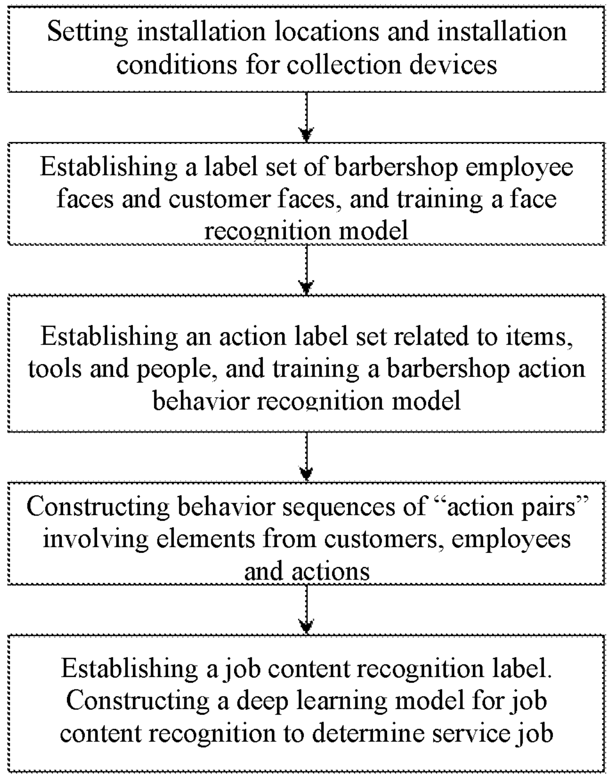
FIG. 1 shows a flowchart of an intelligent recognition method for service job contents of barbershop employees for customers in the present invention.

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference numerals in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

Figure 2:
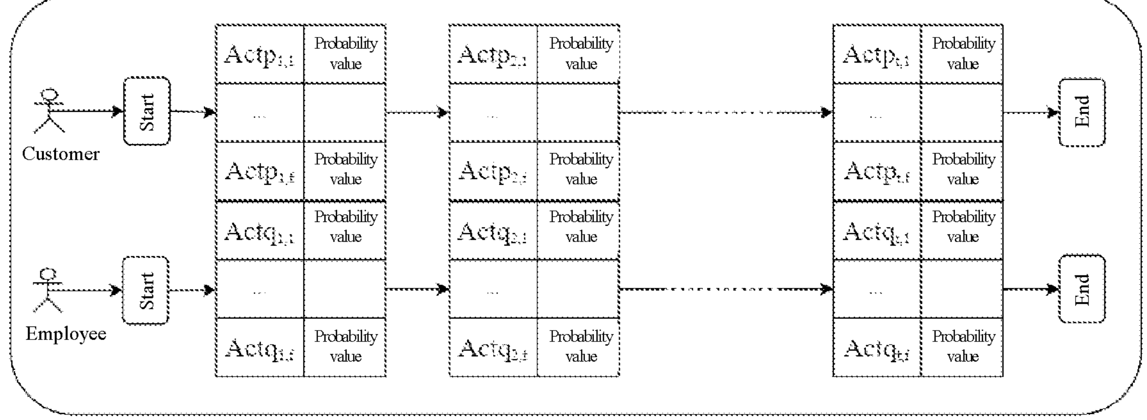
FIG. 2 shows an "action pair" temporal sequence based on "action pair" matrices of a customer and an employee in the present invention.
Figure 3:
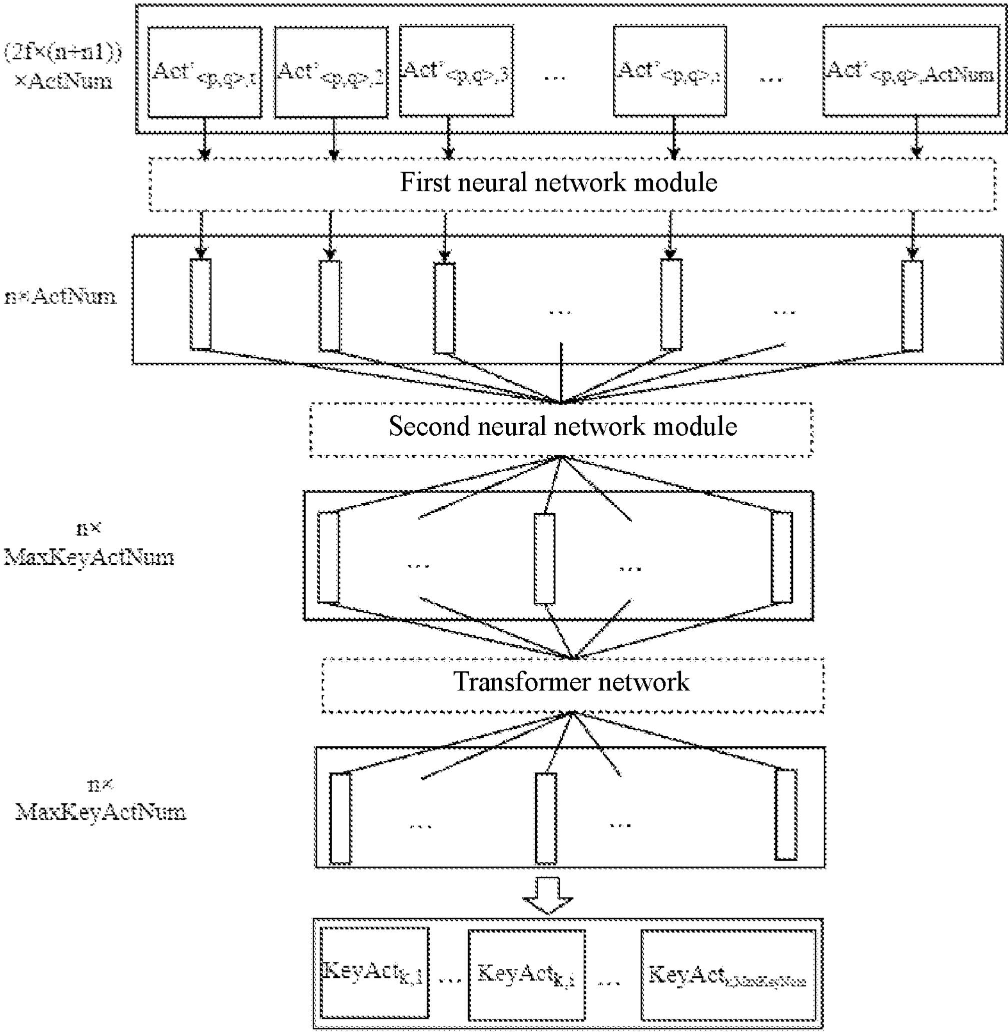
FIG. 3 shows a structural diagram of a deep neural network model for job content recognition in the present invention.

As shown in FIGS. 1-3, the present invention provides an intelligent detection and recognition method for a public service haircut behavior, comprising the following steps:

- S1: setting installation locations and installation conditions for collection devices;
- S2: establishing a label set of barbershop employee faces and customer faces, and training a face recognition model;
- S3: establishing an action label set related to items, tools and people, and training a barbershop action behavior recognition model, which involves recognizing three categories of action behaviors: human actions, object operation interactions and human-to-human interactions that are relevant to the items, the tools, and actions in service jobs;
- S4: conducting action behavior recognition for a practical barbershop service scenario by using the trained face recognition model and the barbershop action behavior recognition model; and constructing behavior sequences of "action pairs" involving elements from customers, employees and actions;
- S5: establishing standard key behavior sequences with various types of barbershop service job contents as labels for job content recognition; and constructing a deep neural network model for job content recognition according to the behavior sequences of "action pairs" recognized and established in S4, to determine service job contents of barbershop employees for customers.

The S1 comprises device installation and the setting of the installation conditions:

- S11: specifying installation locations of collection devices. Cameras are installed on each haircut station for shooting videos of barbershop services in real time, collecting face images of customers and employees at the stations, and capturing barbershop actions of hairdressers at the haircut stations to establish a mapping relationship between face identity information and the actions in a barbershop service process.
- S12: setting installation conditions of hardware devices. It is required that the cameras arranged in a site should have a refresh rate of not less than 30 fps to ensure the real-time requirement of an action recognition model slowfast for high frame rate, and it is also required that the resolutions of the cameras should not be less than 1080P, which can satisfy the requirements of face recognition detection. The real-time video information can be transmitted and processed for subsequent calculation.

The S2 comprises the following steps:

- S21: establishing a label set of scenario faces. Image sizes are uniformly cut to 224*224 pixel sizes by face images of employees and customers. The locations of faces are annotated by an annotation tool labelImg, i.e., the face parts are manually framed and annotated. The location coordinate [x1,y1,x2,y2] of each annotating box is saved, wherein (x1,y1) represents a coordinate of an upper left point of the face annotating box, and (x2,y2) represents a coordinate of a lower right point of the face annotating box. The ID number of the face image is annotated and a face label set of employees and customers is established.

S22: training the face recognition model by using the face label set of employees and customers established in S21. The images are preprocessed, and the face part is aligned by a face detection algorithm, and uniformly cut to 224*224 pixels. In the training process in the face recognition model, an input batch size is 64.

Optionally, the face recognition model uses FaceNet based on a deep convolutional neural network.

The S3 comprises the following steps:

- S31: establishing a label set for barbershop actions. The step of establishing a label set for barbershop action videos is built according to the Google AVA (aomic visual actions) data set annotating rules. The step specifically comprises: firstly, analyzing an originally collected behavior action video according to every 15 minutes, and uniformly dividing the 15-minute video into 300 non-overlapping 3-second clips; following a strategy of maintaining a temporal sequence of actions during sampling; then, manually annotating people bounding boxes for persons using LabelImg for the middle frame of each 3-second clip; for each person in the annotated box, selecting an appropriate label from a prefabricated action label set to describe the actions of the person; dividing the actions into three categories: human postures/displacement actions (sitting postures, standing postures, bending, etc), human/object/human interaction actions (taking a hair dyeing brush for hair dyeing, taking hair clippers for haircut, taking scissors for trimming, etc.) and human/human interaction actions (chatting with customers, etc.); and finally, annotating all the video clips to establish a training label set for barbershop action behavior videos.
- S32: training the action recognition model by using the label set for barbershop actions established in S31. In a training stage, a set of video data is cyclically input from the established behavior recognition training set and a clip (64 frames) is randomly sampled. Then, the clip is inputted to a Slow branch path and a Fast branch path and has 4 frames and 16 frames respectively, and the original video frame is preprocessed (scaled, randomly clipped into 224*224 video frames, and horizontally flipped).

Optionally, a SlowFast action recognition model based on 3D-Resnet50 convolutional neural network is used for action behavior recognition. A SlowFast model is comprised of a Slow branch and a Fast branch. According to the characteristic of low frame frequency of the Slow branch, with Stride=16 frames as an interval, sampling is conducted from the inputted video and inputted into a 3D-Resnet50 backbone network to extract environmental feature information during haircut. According to the characteristics of high frame frequency and low channel of the Fast branch, with step Stride=2 frames as an interval, sampling is conducted from an inputted video frame, and simultaneously, the number of channels is set to ⅛ times of that of the Slow branch, and inputted into the network to extract temporal sequence action feature information during haircut. Transverse connection is conducted on Res_conv3_1 and Res_conv4_1 layers of the 3D-Resnet50 backbone respectively, and the temporal sequence action feature information is integrated into environmental features; and finally, barbershop actions are classified and predicted by using the integrated feature information from both the Slow branch and the Fast branch through a fully connected layer. A training epoch is set as 100.

S33: establishing a key action set of barbershop action behaviors. According to the constructed action behavior label set and in combination with a practical application scenario of a barbershop, all action behaviors are divided into two sets: a key action behavior set, such as cutting hair, curling hair, dyeing hair, perming hair, etc.; and a normal action behavior set, such as communication, standing, sitting, walking, etc. The key action behavior set is represented as $KeyAct=\{KeyAct_1, \ldots, KeyAct_i, \ldots, KeyAct_n\}$, wherein $KeyAct_i$ is the i-th key action behavior, i=1, . . . n, and n represents the number of key action behaviors; and the normal action behavior set is represented as $NormalAct=\{NormalAct_1, \ldots, NormalAct_{i1}, \ldots, NormalAct_{n1}\}$, wherein $NormalAct_{i1}$ is the i1-th normal action behavior, i1=1, . . . n1, and n1 represents the number of normal action behaviors.

The S4 comprises the following steps:

S41: sampling real-time video frames according to certain rules for face recognition and action behavior recognition. The purpose of sampling is to reduce the frequency of face recognition and action recognition, reduce the recognition of repeated identities and actions, reduce the cost of model hashrate, and ensure that key action behaviors of the services can be recognized and obtained. The frequency of recognition and calculation and time cost are reduced to improve the real-time performance of an intelligent device.

S411: firstly, conducting face recognition, and using the trained face recognition model in step S22 for conducting face recognition. Inputting images obtained according to sampling rules into the face recognition model and determining customer membership statuses and employee identity information.

S412: conducting human detection while action behavior recognition is conducted on the SlowFast model. Associating a human region framed in a detection box in a certain frame by the trained SlowFast model with face recognition results of a face frame in a same frame and a same human region in S412 for subsequent people identity tracking when no face is recognized.

S413: meanwhile, recognizing action behaviors of the barbershop employees and customers by using the trained SlowFast model in step S32, comprising: recognition of human posture/displacement actions of customers and employees, interaction behaviors of items and tools used by the employees and customer services in the service process, interaction behaviors of the employees and the customers, etc.

S42: according to confirmation of people identities by face recognition and action behavior recognition in a recognition process of a video temporal sequence, and recognition results of various behaviors, establishing identity correspondence relationships of customers and employees, and specific behavior sequences of "action pairs" in the service process, and recording "action pair" relationships of the customers and the employees in the video temporal sequence.

S421: according to the station location and corresponding camera index information thereof, establishing a correlation relationship between customers and employees at the station; in a service process, when the customer and an employee enter a camera range of a station $station_k$, starting the trained face recognition model in S22; simultaneously completing face recognition of the customer and the employee to activate establishment of a service pair $<Cid_p, Eid_q>$ of the customer and the employee on the station $station_k$, wherein $Cid_p$ represents a customer set, and p=1, . . . , m; $Eid_q$ represents an employee set, and q=1, . . . m1. m and m1 represent numbers of customers and employees respectively.

S422: activating the action behavior recognition model for people identity tracking and behavior recognition. In the camera range of the station $station_k$, the trained barbershop action behavior recognition model in S32 is started. In the action behavior recognition process for a real-time video sequence, at a time t, a recognized action set of customer $Cid_p$ is $Actp_t=\{Actp_{t,1}, \ldots, Actp_{t,k}\}$, such as: sitting, chatting with people, etc. A recognized action set of employee $Eid_q$ is $Actq_t=\{Actq_{t,1}, \ldots, Actq_{t,k1}\}$, such as: standing, cutting hair, chatting with people, etc., wherein k and $k_1$ are numbers of actions recognized by the customers and the employees at time t, and $Actp_{t,k}$ and $Actq_{t,k1}$ are recognized action behaviors:

$$Actp_{t,k} \text{ or } Actq_{t,k1} = \begin{cases} NormalAct_{i1}, & \text{when the action is an ordinary action behavior} \\ KeyAct_i, & \text{when the action is a key action behavior} \end{cases}$$

S423: according to the station location and corresponding camera index information thereof, further establishing correlation relationships between job contents corresponding to the customers, the employees and the service behaviors on the station. At time t, an "action pair" $<Actp_t, Actq_t>$ is formed by the customer $Cid_p$ and the employee $Eid_q$ and an "action pair" matrix is constructed.

sorting each action $Actp_{t,k}$ and $Actq_{t,k1}$ in $Actp_t$ and $Actq_t$ sets are sorted by probability values, and first f actions are take. A vector is formed for each action:

$$Matrixp_{t,f} = [\text{probability value of } Actp_{t,f}, Actp_{t,f}]$$

and $$Matrixq_{t,f} = [\text{probability value of } Actq_{t,f}, Actq_{t,f}]$$

Filling the actions in the vectors and probability values thereof are filled with 0 values if the $Actp_t$ or $Actq_t$ set has no f actions; and the actions in the $Actq_{t,f}$ vector and probability values thereof are filled with 0 values at wait time, such as wait time in a hair dyeing process, in the service process in which the employees may not be in a service region.

Thus, the "action pair" $<Actp_t, Actq_t>$ can be constructed as a 2f*2 matrix $Act_{<p,q>,t}=[Matrixp_{t,1}, \ldots, Matrixp_{t,f}, Matrixq_{t,1}, \ldots, Matrixq_{t,f}]$. In the whole service process, for the customer $Cid_p$, establishing an "action pair" temporal sequence $S_p=[Act_{<p,q>,1}, \ldots, Act_{<p,q>,t}]$ based on the matrix $Act_{<p,q>,t}$ is established according to the video frame sequence.

Optionally, the value of f can be set as 3.

The S5 comprises the following steps:

S51: establishing standard key behavior sequences with various types of barbershop service job contents by the key action behavior set KeyAct obtained from S33 as job content recognition labels. The standard key behavior sequences with various types of service job contents are expressed as $S_k$=[$KeyAct_{k,1}$, . . . , $KeyAct_{k,i}$], wherein $KeyAct_{k,i}$ represents the i-th action in the job contents of the k-th set, and $KeyAct_{k,i}$=KeyAct. Meanwhile, to unify dimensions of all label sequences, all insufficient dimensions are filled with 0 if the number of other key behaviors is insufficient based on the number of key behaviors in a longest standard key behavior sequence to facilitate the calculation.

S52: preprocessing the "action pair" temporal sequence $S_p$=[$Act_{<p, q>,1}$, . . . , $Act_{<p, q>,t}$] for the customer $Cid_p$ obtained from S42 to remove repeated "action pair" matrices with high similarity. A preprocessing method comprises:

(1) Traversing "action pair" matrices on $S_p$, and calculating the similarity of two adjacent "action pair" matrices in $S_p$. Optionally, a method for calculating the similarity of the "action pair" matrices is a cosine similarity of the matrices. A calculation method for the similarity of the two adjacent "action pairs" $Act_{<p, q>j}$ and $Act_{<p, q>j+1}$, (j=1, . . . , t) is as follows: encoding all action behaviors $Actp_{t,k}$ and $Actq_{t,k1}$ in the "action pair" matrices, calculating the cosine similarity of each row in $Act_{<p, q>j}$ and $Act_{<p, q>j+1}$ respectively to obtain similarity vectors, and then calculating arithmetic square roots of the similarity vectors to finally obtain the similarity of the two adjacent "action pair" matrices.

(2) If the similarity of the two adjacent "action pair" matrices is greater than a certain threshold, removing a latter similar "action pair" matrix, which indicates that action behaviors at two adjacent moments are repeated.

(3) Continuing to traverse all the "action pair" matrices on $S_p$ until the temporal sequence is ended (i.e., the service is ended).

After $S_p$ is preprocessed, removing the value probability column of each action; changing the "action pair" matrices into $Act'_{<p, q>t}$=[$Actp_{t,1}$, . . . , $Actp_{t,f}$, $Actq_{t,1}$, . . . , $Actq_{t,f}$]; obtaining the temporal sequence $S_p'$=[$Act'_{<p, q>,1}$, . . . , $Act'_{<p, q>,t}$] from the "action pair" matrix Act'<p, q>,t on the preprocessed temporal sequence; and representing "action pairs" with certain differences by each remaining action in the sequence.

S53: establishing a training data set by $S_p'$ of multiple customer service processes and corresponding job content recognition labels obtained from step S52; meanwhile, constructing a deep neural network model for job content recognition, inputting into the training data set and training the deep neural network model according to $S_p'$ and the corresponding job content label of each customer to minimize losses of the job content sequence vectors obtained by $S_p'$ of each customer through the deep neural network model and the corresponding job content label.

S531: constructing a training data set. Collecting videos and processing as mentioned above, or obtaining multiple $S_p'$ and corresponding job content recognition labels. Filling insufficient sequences with 0 based on a maximum sequence length because the sequence length of each $S_p'$ is different.

S532: a method for constructing the deep neural network model used for job content recognition is as follows: setting the maximum temporal sequence length of the "action pair" as ActNum, and transcoding each behavior in $S_p'$ into a vector with a dimension of (n+n1); the dimension of $S_p'$ after filling is (2f×(n+n1))×ActNum, wherein n represents the number of key action behaviors and n1 represents the number of normal action behaviors;

the steps for executing deep neural network model used for job content recognition is comprised of following parts:

(1) by using $S_p'$ as input after filling and transforming behavior vector, transforming the ((2f×(n+n1))×ActNum)-dimensional input data into (n×ActNum)-dimensional features through the first neural network module.

(2) Then, transforming the (n×ActNum)-dimensional features into n×MaxKeyActNum dimensional features through the second neural network module. MaxKeyActNum represents the number of key behaviors in a maximum standard key behavior sequence among different job contents.

(3) Finally, inputting the (n×MaxKeyActNum)-dimensional features into a Transformer network, wherein position marks of (n×MaxKeyActNum)-dimensional feature sequences are divided according to each behavior and enter the Transformer network for position Embedding. MaxKeyActNum key behavior vectors are finally outputted, and mapped to the corresponding standard key behavior sequences of job contents to achieve the purpose of recognizing and outputting the job contents.

Optionally, the first neural network module and the second neural network module in the whole model can be different structural modules such as DNN or CNN.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

The invention claimed is:

1. An intelligent recognition method for job contents of barbershop employees, characterized by the following steps:

S1: specifying installation locations and hardware conditions for collection devices, and recognizing barbershop employees and customers;

S2: establishing a label set of barbershop employee faces and customer faces, and training a face recognition model;

S3: establishing an action label set related to items, tools and people, and training a barbershop action behavior recognition model, which involves recognizing three categories of action behaviors: human actions, object operation interactions and human-to-human interactions that are relevant to the items, the tools, and actions in service jobs;

S4: conducting action behavior recognition for a practical barbershop service scenario by using the trained face recognition model and the barbershop action behavior recognition model;

and constructing behavior sequences of "action pairs" involving elements from customers, employees and actions;

wherein S4 further comprises the following steps:

S41: sampling real-time video frames according to certain rules for face recognition and action behavior recognition;

S42: according to confirmation of people identities by face recognition and action behavior recognition in a recognition process of a video temporal sequence, and recognition results of various behaviors, establishing identity correspondence relationships of customers and employees, and specific behavior sequences of "action pairs" in the service process, and recording "action pair" relationships of the customers and the employees in the video temporal sequence;

wherein step S42 further comprises the following steps:

S421: according to the station location and corresponding camera index information thereof, establishing a correlation relationship between customers and employees at the station; in a service process, when a customer and an employee enter the camera range of a station $station_k$, simultaneously completing face recognition of the customer and the employee by using the trained face recognition model in step S2 to activate establishment of a service pair $<Cid_p, Eid_q>$ of the customer and the employee on the station $station_k$, wherein $Cid_p$ represents a customer set, and p=1, . . . , m; $Eid_q$ represents an employee set, q=1, . . . m1, and m and m1 represent numbers of customers and employees respectively;

S422: activating the action behavior recognition model for people identity tracking and behavior recognition; in the camera range of the station $station_k$, conducting action behavior recognition for a real-time video sequence through the trained barbershop action behavior recognition model in step S32, wherein at time t, a recognized action set of customer Cidp is $Actpt=\{Actp_{t,1}, \ldots, Actp_{t,k}\}$; and a recognized action set of employee $Eid_q$ is $Actq_t=\{Actq_{t,1}, \ldots, Actq_{t,k1}\}$, wherein k and k1 are numbers of actions recognized by the customers and the employees at time t, and $Actp_{t,k}$ and $Actq_{t,k1}$ are recognized action behaviors:

$$Actp_{t,k} \text{ or } Actq_{t,k1} = \begin{cases} NormalAct_{i1}, & \text{when the action is a normal action behavior} \\ KeyAct_i, & \text{when the action is a key action behavior} \end{cases}$$

S423: according to the station location and corresponding camera index information thereof, further establishing correlation relationships between job contents corresponding to the customers, the employees and the service behaviors on the station; at time t, forming an "action pair" $<Actp_t, Actq_t>$ by the customer $Cid_p$ and the employee $Eid_q$, and constructing an "action pair" matrix;

sorting each action $Actp_{t,k}$ and $Actq_{t,k1}$ in $Actp_t$ and $Actq_t$ sets by probability values, respectively, taking first f actions, and forming a vector for each action:

$$Matrixp_{t,f} = [Actp_{t,f}, \text{probability value of } Actp_{t,f}]$$

or $$Matrixq_{t,f} = [Actq_{t,f}, \text{probability value of } Actq_{t,f}]$$

filling the actions in the vectors and probability values thereof with 0 values if the Actpt or Actqt set has no f actions;

thus, constructing a 2f*2 matrix $Act_{<p,q>,t}=[Matrixp_{t,1} \ldots, Matrixp_{t,f}, Matrixq_{t,1} \ldots, Matrixq_{t,f}]$ through the "action pair" $<Actp_t, Actq_t>$; and in the whole service process, for the customer Cidp, establishing an "action pair" temporal sequence $S_p=[Act_{<p,q>,1} \ldots, Act_{<p,q>,t}]$ based on the matrix $Act_{<p,q>,t}$ according to the video frame sequence

S5: establishing standard key behavior sequences with various types of barbershop service job contents as labels for job content recognition; and constructing a deep neural network model for job content recognition according to the behavior sequences of "action pairs", to determine service job contents of barbershop employees for customers.

2. The intelligent recognition method for job contents of barbershop employees according to claim 1, characterized in that the step S1 specifically comprises: capturing video frames in a barbershop scenario to satisfy requirements of confirming employee IDs, identifying customers, and detecting and recognizing items, the tools, and behavior actions.

3. The intelligent recognition method for job contents of barbershop employees according to claim 1, characterized in that the step S3 specifically comprises the following steps:

S31: building a label set for action behaviors that encompasses three categories: human actions, object operation interactions and human-to-human interactions; this set is related to the items, the tools and people involved in a service process, following the labeling rules of the AVA dataset;

S32: training the barbershop action behavior recognition model, according to the established action behavior label set;

S33: establishing a key action set of barbershop action behaviors.

4. The intelligent recognition method for job contents of barbershop employees according to claim 3, characterized in that step S31 specifically comprises the following steps:

S311: firstly, analyzing an originally collected behavior action video according to every 15 minutes, and uniformly dividing the 15-minute video into 300 non-overlapping 3-second clips; and following a strategy of maintaining a temporal sequence of actions during video sampling;

S312: then, manually annotating bounding boxes for persons using an annotation tool LabelImg for the middle frame of each 3-second clip;

S313: for each person in the annotated box, selecting an appropriate label from a prefabricated action label set to describe the actions of the person; the actions of the person include the following three categories of labels: human postures or displacement actions, human-object-human interaction actions, and human-human interaction actions;

S314: finally, annotating all the video clips to establish a training label set for barbershop action behavior videos.

5. The intelligent recognition method for job contents of barbershop employees according to claim 3, characterized in that in the step S32, a SlowFast model based on 3D-Resnet50 network is used for action behavior recognition; the SlowFast model is comprised of a Slow branch and a Fast branch;

firstly, with Stride=16 frames as an interval, sampling is conducted from an inputted video and inputted into a 3D-Resnet50 backbone network to extract environmental feature information during haircut;

secondly, with Stride=2 frames as an interval, sampling is conducted from an inputted video frame, and simultaneously, the number of channels is set to ⅛ times of that of the Slow branch, and inputted into the network to extract temporal sequence action feature information during haircut;

then transverse connection is conducted on Res_conv3_1 and Res_conv4_1 layers of the 3D-Resnet50 backbone respectively, and the temporal sequence action feature information is integrated into environmental features;

finally, classifying and predicting barbershop actions by using the integrated feature information from both the Slow branch and the Fast branch through a fully connected layer.

6. The intelligent recognition method for job contents of barbershop employees according to claim 3, characterized in that in the step S33, according to the constructed action behavior label set and in combination with a practical application scenario of a barbershop, all action behaviors are divided into two sets:

a key action behavior set: comprising cutting hair, curling hair, dyeing hair, perming hair, etc.; the key action behavior set is represented as KeyAct={$KeyAct_1$, . . . , $KeyAct_i$, . . . , $KeyAct_n$}, wherein $KeyAct_i$ is the i-th key action behavior, i=1, . . . n, and n represents the number of key action behaviors;

a normal action behavior set: comprising communication, standing, sitting, walking, etc.; and the normal action behavior set is represented as NormalAct= {NormalAct1, . . . , NormalActi1, . . . , NormalActn1}, wherein NormalActi1 is the i1-th normal action behavior, i1=1, . . . n1, and n1 represents the number of normal action behaviors.

7. The intelligent recognition method for job contents of barbershop employees according to claim 1, wherein step S41 further comprises the following steps:

S411: in the process of the barbershop service, sampling real-time video frames at a certain frame rate for identity recognition and action behavior recognition of people in real-time videos;

S412: inputting images obtained according to sampling rules into the face recognition model and determining customer membership statuses and employee identity information;

S413: associating the human regions delineated by detected boxes in a certain frame using the trained SlowFast model with face recognition results of face boxes in a same frame and a same human region in S412 for subsequent people identity tracking when faces cannot be recognized;

S414: recognizing action behaviors of the barbershop employees and customers by using the trained SlowFast model in step S32, comprising: human posture/displacement actions of customers and employees, interaction behaviors of items and tools used by the employees and customer services in the service process, and interaction behaviors of the employees and the customers.

8. The intelligent recognition method for job contents of barbershop employees according to claim 1, characterized in that the step S5 comprises the following steps:

S51: establishing standard key behavior sequences with various types of barbershop service job contents by the key action behavior set KeyAct obtained from step S33 as job content recognition labels, expressed as $S_k$=[$KeyAct_{k,1}$ . . . , $KeyAct_{k,i}$], wherein $KeyAct_{k,i}$ represents the i-th action in the k-th job content, and $KeyAct_{k,i}$∈KeyAct; and based on the length of the key behavior sequence in the longest standard, if the number of key behaviors in other sequences is insufficient, filling the remaining dimensions with 0;

S52: preprocessing the “action pair” temporal sequence $S_p$=[$Act_{<p, q>,1}$ . . . , $Act_{<p, q>,t}$] for the customer $Cid_p$ obtained from step S42, with a preprocessing method as follows:

S521: traversing “action pair” matrices in $S_p$, and calculating the similarity of two adjacent “action pair” matrices in $S_p$ by using matrix cosine similarity;

S522: if the similarity of the two adjacent “action pair” matrices is greater than a threshold, removing a latter “action pair” matrix, which indicates that action behaviors at adjacent time steps are repetitive;

S523: continuing to traverse all the “action pair” matrices in $S_p$ until the end of the temporal sequence;

after $S_p$ is preprocessed, removing the probability value column of each action; changing the “action pair” matrices into $Act'_{<p, q>,t}$=[$Actp_{t,1}$ . . . , $Actp_{t,f}$, $Actq_{t,1}$ . . . , $Actq_{t,f}$]; obtaining the temporal sequence $S_p$'=[$Act'_{<p, q>,1}$ . . . , $Act'_{<p, q>,t}$] according to the “action pair” matrix $Act'_{<p, q>>,t}$ from the preprocessed temporal sequence, in which each remaining actions represent “action pairs” with certain differences;

S53: establishing a training data set by $S_p$' from multiple customer service processes and corresponding job content recognition labels obtained by step S52, constructing a deep neural network model for job content recognition, inputting into the training data set and training the deep neural network model according to $S_p$' and the corresponding job content label of each customer to minimize losses of the job content sequence vectors obtained by $S_p$' of each customer through the deep neural network model and the corresponding job content label, specifically comprising the following steps:

S531: constructing a training data set, collecting videos and processing as mentioned above, or obtaining multiple $S_p$' and corresponding job content recognition labels, and filling insufficient sequences with 0 based on the maximum sequence length of $S_p$';

S532: a method for constructing the deep neural network model used for job content recognition is as follows: setting the maximum temporal sequence length of the “action pair” as ActNum, and transcoding each behavior in $S_p$' into a vector with a dimension of (n+n1); the dimension of $S_p$' after filling is (2f×(n+n1))×ActNum, wherein n represents the number of key action behaviors and n1 represents the number of normal action behaviors;

the steps for executing the deep neural network model used for job content recognition are as follows:

firstly, by using $S_p$' as input after filling and transforming behavior vector, transforming the ((2f×(n+n1))×ActNum)-dimensional input data into (n×ActNum)-dimensional features through the first neural network module; then, transforming the (n×ActNum)-dimensional features into (n×MaxKeyActNum)-dimensional features through the second neural network module, wherein MaxKeyActNum represents the number of key behaviors in a maximum standard key behavior sequence among different job contents;

finally, inputting the (n×MaxKeyActNum)-dimensional features into a Transformer network, wherein position marks of (n×MaxKeyActNum)-dimensional feature sequences are divided according to each behavior, and entering the Transformer network for position Embedding, and MaxKeyActNum key behavior vectors are finally outputted and mapped to the corresponding standard key behavior sequences of job contents.

* * * * *